(12) United States Patent
Gasser (10) Patent No.: US 12,509,340 B2
(45) Date of Patent: Dec. 30, 2025

(54) CONTAINER FEEDING SYSTEM FOR TRANSPORTING CONTAINER, AS WELL AS PROCESSING DEVICE AND METHOD FOR TRANSPORTING CONTAINER

(71) Applicant: Ferrum Packaging AG, Schafisheim (CH)

(72) Inventor: Cyrill Gasser, Lenzburg (CH)

(73) Assignee: Ferrum Packaging AG, Schafisheim (CH)

( * ) Notice: Subject to any disclaimer, the term of this patent is extended or adjusted under 35 U.S.C. 154(b) by 0 days.

(21) Appl. No.: 18/713,114

(22) PCT Filed: Dec. 13, 2021

(86) PCT No.: PCT/EP2021/085503
§ 371 (c)(1),
(2) Date: May 23, 2024

(87) PCT Pub. No.: WO2023/110057
PCT Pub. Date: Jun. 22, 2023

(65) Prior Publication Data
US 2025/0026625 A1    Jan. 23, 2025

(51) Int. Cl.
*B67C 7/00*    (2006.01)
*B65G 19/02*    (2006.01)
(Continued)

(52) U.S. Cl.
CPC .............. *B67C 7/004* (2013.01); *B65G 19/02* (2013.01); *B65G 19/185* (2013.01);
(Continued)

(58) Field of Classification Search
CPC ..... B65B 43/52; B65B 7/2807; B65B 35/205; B65B 35/54; B65B 43/50; B65B 5/106; B65B 61/188
(Continued)

(56) References Cited

U.S. PATENT DOCUMENTS 3,198,316 A * 8/1965 Bivans .................. B65G 19/02
198/586
5,692,594 A * 12/1997 Sidler .................. B65G 47/841
198/732
2016/0083130 A1    3/2016 Garriga Jimenez et al.

FOREIGN PATENT DOCUMENTS

EP    3901084 A1 * 10/2021 .......... B65G 47/841
FR    2375119 A1    7/1978
(Continued)

OTHER PUBLICATIONS

International Search Report issued Aug. 8, 2022 in corresponding International Application No. PCT/ EP2021/085503.

*Primary Examiner* — Jacob A Smith
(74) *Attorney, Agent, or Firm* — Global IP Counselors, LLP (57) ABSTRACT

A container feeding system for transporting a container along a transport path from a container source to a container receiver. The container feeding system includes a carrier for receiving and transporting the container, a pulling element connected to the carrier in such a way that the carrier can be moved along the transport path, a guide arranged along the transport path for guiding the carrier along the transport path. The carrier is arranged at the guide in such a way that the carrier can be moved by the pulling element in a sliding manner along a first surface of the guide.

18 Claims, 5 Drawing Sheets

(51) Int. Cl.
*B65G 19/18* (2006.01)
*B65G 19/20* (2006.01)

(52) U.S. Cl.
CPC .... *B65G 19/205* (2013.01); *B65G 2201/0252* (2013.01); *B67C 2007/006* (2013.01); *B67C 2007/0066* (2013.01)

(58) Field of Classification Search
USPC .................................. 53/251, 237, 240, 252
See application file for complete search history.

(56) References Cited

FOREIGN PATENT DOCUMENTS

| | | |
|---|---|---|
| GB | 441681 A | 1/1936 |
| NL | 66033 C | 7/1950 |

* cited by examiner

CONTAINER FEEDING SYSTEM FOR TRANSPORTING CONTAINER, AS WELL AS PROCESSING DEVICE AND METHOD FOR TRANSPORTING CONTAINER

CROSS-REFERENCE TO RELATED APPLICATION

This application is a U.S. National Stage application of PCT/EP2021/085503, filed Dec. 13, 2023, the contents of which are hereby incorporated by reference in its entirety.

BACKGROUND

Technical Field

The disclosure relates to a container feeding system for transporting a container along a transport path from a container source to a container receiver, as well as a processing device for processing the container and a method for transporting containers.

Background Information

A conventional container feeding system for transporting a container to a container receiver is disclosed in DE 4236784 A1, for example.

In the food industry, it is usual to use a production line for transporting a container. In this process, a container is delivered from a container providing system to a container feeding system. This system then feeds the container to a container processing device. The foodstuff in question is filled into the container and/or the container is sealed with a lid by this container processing device.

In the beverage industry in particular, but not only, the common practice is to convey beverage cans after the filling process by a container feeding system in the form of a so-called infeed table into a sealing module (also container sealer) in the form of a can sealer. This infeed table consists of a sliding belt on which the cans are arranged upright and are transported by chain carriers. To prevent a lateral breakaway of the can flow, side guiding rails limit a lateral movement of the cans.

In the sealing module, the still open cans reach the so-called seaming station where they are applied with a lid and at the same time the headspace of the container is gassed with a protective gas or an inert gas to ensure the shelf life of the product. Subsequently, the container on the seaming station is set in rotation, while the seaming station simultaneously rotates about the central axis of the sealing module. Since in practice several seaming stations are used on a carrousel-like middle part of the sealing module, higher sealing rates are possible.

For example, can sealers are known from DE 749636 and DE 4234115 A1. Can sealers comprise a clamping device for receiving a can to be sealed. In the operating state, the can to be sealed is introduced into the clamping device and secured by it in axial and radial direction. A can lid is also introduced centered over the can opening of the can body to be sealed. The can body has a circumferential can flange in the area of the can opening and the can lid has a circumferential can lid flange. For sealing the can opening by the can lid, the can sealer additionally comprises two seaming rolls, mounted rotatably about an axis in each case, which press the can flange and the can lid flange together by a force acting substantially radially, the pressing being effected by a continuous rolling in the circumferential direction along the circumference of the can opening. During this seaming of the can lid to the can body, the cans usually run in the carousel of the sealer around an axis of rotation. On one circumference of the carousel, the units made up of the seaming head and, as a rule, two seaming rolls are arranged.

SUMMARY

For a better understanding of the present disclosure, a container feeding system known from the state of the art in the form of an infeed table according to DE 42 36 784 A1 is first described in the following on the basis of FIG. 1. The infeed table briefly described above could, for example, be designed in this way.

For a better distinction of the known state of the art from the present disclosure, reference signs to features of known devices are provided with an inverted comma (in FIG. 1) in the context of this application, whereas features to devices according to the disclosure or their components do not carry an inverted comma.

Figure 1:
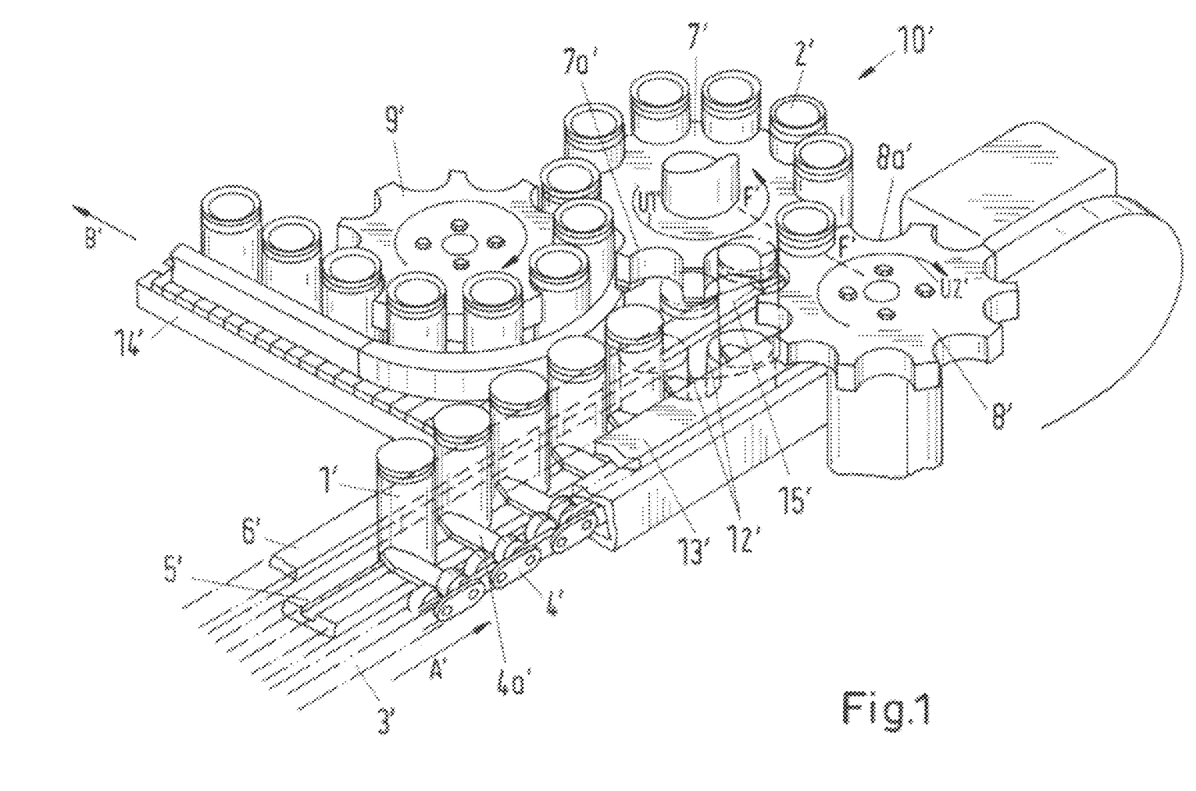
FIG. 1 illustrates feeding system known from the state of the art.

In the known transport module 3' according to FIG. 1, a container 1' previously filled with contents in a filling device not shown in FIG. 1, in the present example a metallic can 1' for receiving a beverage or for receiving another foodstuff or any other product, is pushed on a rail 5' of the transport module 3' in direction A' by a finger 4a' attached to a drive chain 4'. The can 1' is guided on its opposite sides by a guide rail 6' and a chain-side guide 13'. Then, the can 1' is transferred to a can lifter 12' of a sealing module 10', which moves synchronously with the transport module 3', and enters a recess 7a' of a sealing rotary head 7', which rotates in the circumferential direction U1'. When entering the sealing rotary head 7', a recess 8a', 15' of an opposite rotary head 8' or of a counter rotary head 8', respectively, which is preferably arranged at a position symmetrical to the sealing rotary head 7' and which rotates synchronized with the sealing rotary head 7' in the reverse direction of rotation U2', and the recess 7a' of the sealing rotary head 7' hold the container 1' in position on a line F'-F' from opposite sides and center the container 1' in a position suitable for sealing or crimping. After a container lid 2' has been crimped to the container 1' by a sealing or crimping roll not shown, the container 1' sealed with the container lid 2' moves via an ejector rotary head 9' and an ejector rail 14' in the direction B' via a can ejector conveyor 9' and is then fed to the next step in the sequence or process.

The transport of the containers to the container receiver is thus usually performed by sliding of the container on a transport rail from the container providing system to the container receiver (i.e., along a transport path), wherein the container is guided by a carrier, a finger, for example. This finger is connected to a chain (so-called chain carrier), which is arranged along the transport rail. The chain is preferably circulating and attached to deflection rolls or other components which allow that the chain can be moved by a drive. Here, the chain is a rolling chain, which is guided over a rolling surface.

However, there are also other ways to transport containers. Containers (such as cartons) can, for example, be transported via a rail system with slides. In this method, the cartons are loaded onto the slides, which in turn sit on the rail system. By small wheels, rollers or rolls attached to the slides, the slide moves along the rail system. To prevent the slides from derailing, the rail is enclosed on both sides by wheels, rollers, or rolls.

It has been determined that these devices, known from the state of the art, have some disadvantages.

The chain drive, which is required for the transport of the container produces abrasion (on the chain and the rolling surface) which, just like the lubricant required for the chain, can get into the containers, and can thus lead to contamination. In addition, the cleaning of the chain causes problems, as there are dead spaces between the individual links, which provide room for contamination and can be colonized by microorganisms. As with all filling processes, there is also a risk of spillage of filling material when filling foodstuff. However, since any spillage of foodstuff entails accelerated growth of microorganisms, a regular cleaning is necessary. The cleaning of the chain is by its very nature synonymous with plant downtime, which is to be avoided for cost reasons.

Furthermore, the type of force transmission in this form of drive ensures adverse effects. Due to the fact that chains are made of a rigid material, they transmit vibrations and irregularities in the force development of the drive directly to the fingers and thus to the containers, which can lead to increased spillage of the contents. A higher amount of spilled product is thereby equivalent to a higher loss for the producing company.

The rail systems with slides also have disadvantages. In the bearings of the rollers and rolls, as well as their connecting pieces, there are not only dead spaces, but the bearings must also be provided with appropriate lubricants.

Starting from the state of the art, it is the object of the disclosure to provide a container feeding system, a processing device, and a method for the transport of containers, which avoid the adverse effects known from the state of the art.

In particular, downtimes due to cleaning work are to be reduced or avoided. Especially, the container feeding system should be flexibly adaptable to the different sealing modules in use and usable with these, so that even very modern sealing modules can be optimally supplied with containers to be sealed. In addition, it should be considered that more complicated structures, which require many individual parts, are generally more susceptible to damage occurring during operation and thus need to be repaired more frequently. These repairs, in turn, mean increased plant downtime and thus increased loss to the operator. A reduction in the quantity of parts used is therefore, in particular, another object of the disclosure.

The object is met by a container feeding system according to the disclosure, a processing device according to the disclosure and the method according to the disclosure.

According to the disclosure, a container feeding system for transporting a container (in particular a can) along a transport path from a container source to a container receiver is proposed. Thus, the transport path is located between the container source and the container receiver and corresponds to the distance covered by the container.

The container feeding system comprises a carrier for receiving and transporting the container, a pulling element which is connected to the carrier in such a way that the carrier can be moved along the transport path and a guide arranged along the transport path for guiding the carrier along the transport path.

Here, the carrier is arranged at the guide in such a way that the carrier can be moved by the pulling element in a sliding manner along a first surface of the guide.

"In a sliding manner" means in particular that the carrier slides along a first surface of the guide, preferably at a constant speed. Here, a contact is thus made between a surface of the carrier (or a surface of an element connected to the carrier) and the first surface. Due to the contact between the carrier and the guide, forces and moments arising during the container transport can be absorbed by the guide.

Thus, the disclosure enables in particular a significant reduction of the vibrations transmitted by the pulling element to the carrier and thus to the transported container. In addition, a reduction in dead spaces is made possible since the pulling element no longer has to be designed as a chain carrier. Thus, this distinguishing feature eliminates the disadvantages of the state-of-the-art DE 4236784 A1, where, in contrast to the disclosure, a carrier is disclosed without a guide, which, moreover, is not arranged at any guide in a sliding manner and thus with low vibration.

In the operating state, the container is thus received by the carrier and transported by the carrier along the transport path from the container source to the container receiver. The carrier slides on the guide and is guided by the guide along the transport path. The carrier is thus arranged at the guide in a sliding manner and prevents, in this way, vibrations occurring in the operating state that are transmitted to the containers.

Preferred embodiments of the disclosure are set forth herein.

Particularly preferably, the carrier can comprise a sliding element having at least a first sliding surface. Here, the sliding surface is arranged at the first surface such that the carrier can be moved via the sliding element in a sliding manner along the first surface of the guide. In addition, the carrier can be designed as a finger, as is known from the state of the art.

In a preferred embodiment of the disclosure, the first sliding surface can be a first supporting surface which rests on the first surface (i.e., is supported on the guide) in such a way that the carrier can be moved in a sliding manner via the supporting surface along the first surface of the guide. Due to the fact that the supporting surface rests on the guide, the carrier supports its weight on the guide. This enables a very large selection of pulling elements, since the weight of the carriers does not have to be carried by the pulling element. In the operating state, the carriers are guided in particular in a horizontal plane. In this way, the containers can also be transported horizontally (preferably sliding via a surface).

In combination with the embodiment with the first supporting surface, the pulling element (at least along the transport path or the guide) can be arranged in such a way that it can be moved in a free-floating manner. I.e., in contrast to the state of the art with the roller chain, which is guided over a rolling surface, the pulling element (at least along the transport path or the guide) has no contact with a base or a bearing surface but is guided "in the air" without contact. In this embodiment, the pulling element is connected to the carrier and thus supported on the guide via the carrier.

Furthermore, the sliding element can comprise a second sliding surface and the second sliding surface can be arranged at the supporting surface, in particular substantially perpendicular to the supporting surface, in such a way that the second sliding surface can be moved in a sliding manner along a second surface of the guide. In addition, the sliding element can comprise a third sliding surface and the third sliding surface can be arranged at the supporting surface, in particular substantially perpendicular to the supporting surface and spaced from the second sliding surface, in such a way that the third sliding surface can be moved in a sliding manner along a third surface of the guide. In practice, it is particularly preferred if the sliding element has a shape corresponding to the guide. Thus, the sliding element can have a recess which corresponds to the shape of the guide in such a way that the recess can be (or is) arranged on the guide and the sliding surfaces which surround the recess are arranged at the guide. For example, the guide can have a rectangular cross-section and the sliding element can have a recess with a rectangular cross-section. The second and third sliding surface can be side surfaces that laterally limit the movement of the sliding element on the guide.

In addition, the carrier can be arranged at the guide in such a way that the carrier can be exclusively moved in a sliding manner along the guide. i.e., between carrier and guide (or between sliding element and guide) there is only a sliding contact in that the contacting surfaces of the carrier/sliding element and the guide slide on each other. Thus, there is no further contact, e.g., by a rolling element. This is advantageous, since further elements lead to a complicated device with more dead spaces.

The sliding element can be an element separate from the carrier and attached to the carrier (for example by a screw connection), which is arranged between the carrier and the guide. As an alternative, the sliding element and the carrier can be made in one piece, so that the sliding element is an integral element of the carrier.

In an embodiment of the disclosure, the container feeding system can comprise a drive which is coupled to the pulling element in such a way that the pulling element can be moved by the drive, in particular can be moved in a free-floating manner as previously described. In an embodiment of the disclosure, the transport path between the container source and the container receiver can thus be covered due to a force from a drive.

The drive can be any energy source from the state of the art that is suitable for driving the pulling element. In particular, the pulling element can be a belt, a chain, a strap, or a similar component. Particularly preferably, however, the pulling element is a circulating strap, in particular a toothed flat belt, to which the carriers are attached (for example, screwed or bonded) either directly or via the sliding element.

For example, the drive can be a motor, in particular a servomotor. In particular, the pulling element can be arranged at the drive in such a way that the pulling element can be moved by the drive. The carrier is also set in motion by the movement of the pulling element. If the pulling element is a circulating pulling element, such as a circulating toothed flat belt, the container feeding system preferably comprises the motor and a second motor or a deflection roller. The circulating pulling element is then set in motion by the motor and runs over the deflection roller. If the pulling element can be moved in a free-floating manner by the drive, the pulling element can, in addition to being supported by the guide, be supported by the drive, or clamped between the drive and the deflection roller (or another drive).

The container feeding system according to the disclosure can comprise a plurality of carriers, wherein the plurality of carriers is connected to the (single) pulling element, in particular attached to the pulling element. In particular, the carriers can be evenly distributed over the pulling element so that a plurality of containers can be effectively transported. In all embodiments of the disclosure, a (single) pulling element preferably comprises a plurality of carriers to enable a simultaneous transport of a plurality of containers. In particular, the pulling element can also comprise a plurality of ropes, in particular twisted ropes, wherein a plurality of carriers is attached to the plurality of ropes.

According to a further embodiment, the pulling element can be arranged spaced from the guide in such a way that no contact occurs between the pulling element and the guide during the movement of the carrier along the first surface. This is possible because the pulling element is supported by the carrier at, in particular on, the guide and avoids unnecessary contact and thus wear. The spaced pulling element can be particularly preferably moved in a free-floating manner, as described above.

In an embodiment, the container feeding system according to the disclosure can comprise a conveyor track with a transport surface for the containers, as known in the state of the art according to FIG. 1 as rail 5', wherein the conveyor track is arranged along the guide in such a way that the containers can be moved by the carrier in a sliding manner over the transport surface. In principle, the conveyor track thus runs at least partially along the transport path. In an embodiment of the container feeding system according to the disclosure, with a sliding transport of the containers, the conveyor track can in particular be a circulating track. Thus, the conveyor track is in particular a circuit and leads, in the direction of movement of the carrier during operation, on a first portion from the container source to the container receiver and on a second portion of the same circulating track back from the container receiver to the container source or another container processing device. In the operating state, the containers are transported only on the first portion along the transport path, i.e., from the container source to the container receiver.

The fact that the containers are moved in a sliding manner on a transport surface of the conveyor track means that the transported containers are in direct contact with the transport surface and are conveyed in a sliding manner on it, in particular at a constant speed. The conveyor track itself can be made of different materials. For example, metals and plastics are conceivable, but it is advisable to use a material that is as low-wear, heat-resistant, and fine-pored as possible in order to meet the requirements for hygiene and heat due to friction. In addition, low-wear materials prevent short maintenance intervals and thus expensive downtimes.

In particular, the use of alloys, ceramic materials such as carbides, in particular silicon carbide, and thermoplastic plastics such as polyethylene, polyetheretherketone or polytetrafluoroethylene is suitable for various embodiments. This is particularly interesting for the components guide and carrier. Since a lot of friction occurs here due to the sliding contact, it is particularly advantageous to manufacture these parts from materials that are as low-wear, heat-resistant and fine-pored as possible.

In addition, the containers can also be carried along in a floating manner, for example by the carriers having a pincer-shaped design and thus being able to enclose the containers. By enclosing the containers, it is possible to carry them safely through the air so that they have no contact with a base during the entire transport along the transport path and consequently no base is necessary. Preferably, however, the carrier is designed as a finger, as in the state of the art, which pushes the containers along the transport path.

Furthermore, embodiments are conceivable in which container guiding devices are arranged at the conveyor track (as known, for example, from the state of the art according to FIG. 1 as 6' and 13'). For example, these can be simple belts, which are mounted parallel to the pulling element and at a distance of the width of the conveyor track, and which extend along the transport path from the container source to the container receiver. Due to these container guiding devices, it is prevented that containers deviate from the transport path during operation. This could happen, for example, in curves or during rapid changes in direction of the conveyor track. Particularly preferably, however, the carriers according to the disclosure are shaped, in particular curved, in such a way that the containers are held in position by the carrier and consequently no corresponding container guide devices are required.

Furthermore, the guide can comprise at least one straight portion and at least one curved portion. In practice, the guide preferably comprises a plurality of differently shaped portions and can thus be flexibly adapted to the required transport path between the container source and the container receiver.

Several guides can also be used, which are either arranged parallel to each other with respect to a direction of movement of the containers, so that a carrier is simultaneously arranged in a sliding manner on several guides, or are arranged in series, so that the carrier has no contact with any guide in an area after a first guide and is subsequently guided onto a second guide. The series connection with an area without a guide is particularly useful for an embodiment in which no guide is arranged in the area of a drive and/or a deflection roller.

The disclosure further relates to a processing device for processing a container, comprising a container source, a container receiver, and the container feeding system according to the disclosure. The container can be transported from the container source to the container receiver by the container feeding system.

In practice, the container source can be, for example, a container dispenser known per se from the state of the art for providing empty containers and/or the container receiver can be designed in the form of a filling station for filling the container with a filling material. Of course, the container source can also be designed in the form of a filling station for filling the container with a filling material and/or the container receiver is realized in the form of a sealing module for sealing the container by a lid.

In particular, the filling station can function in parallel as a container receiver and a container dispenser. The empty containers are fed to the filling station from a corresponding container dispenser, in certain cases possibly by the container feeding system according to the disclosure, then the containers are filled with a filling material in the filling station, wherein the filled container is then transferred to a further container feeding system according to the disclosure of the processing device, which finally conveys the filled container to a sealing module and transfers the container to the latter for sealing. It is understood that in all embodiments, the transport path can comprise at least one straight portion and at least one curved portion. For the embodiments comprising a guide, it is understood that the guide can also comprise at least one straight portion and at least one non-straight portion.

Finally, the disclosure also relates to a method for the transport of a container from a container source to a container receiver by a container feeding system according to the disclosure, in particular a method for the transport of a container by using a processing device according to the disclosure, wherein the container feeding system is arranged between a receiving area and a transfer area between the container source and the container receiver. In the process, the container is received in the receiving area and transported to the transfer area by the carrier provided on the container feeding system.

As will be explained in the description of the figures, the carrier can be moved here in a sliding manner along the first surface of the guide, either with the aid of a sliding element or without a sliding element, so that fewer vibrations are transmitted to the transported container. The transport of the container can be carried out exclusively in a sliding manner, whereby the carrier or the sliding element is in direct contact with at least one first surface of the guide, in particular via at least one sliding surface.

In the context of the disclosure, a container feeding system according to the disclosure or a processing device or a method for the transport of containers according to the present disclosure is particularly advantageously used in the food industry, wherein beverage cans or food cans are preferably used as containers and the individual beverage can or food can is filled with a foodstuff.

In practice, known can sealers/sealers or fillers can be modified with the container feeding system according to the disclosure, in order to avoid the disadvantages of the state of the art in this way. In particular, a device according to FIG. 1 can be modified to a container feeding system according to the disclosure by exchanging the carrier 4a' with a carrier according to the disclosure with guide.

BRIEF DESCRIPTION OF THE DRAWINGS

The disclosure will be explained in more detail hereinafter with reference to the drawings.

DETAILED DESCRIPTION

As already mentioned, FIG. 1 illustrates the state of the art. To avoid confusion, reference signs to features from this drawing are provided with an inverted comma, reference signs to features from FIGS. 2 to 7 are used without an inverted comma.

The designations of the individual components in FIG. 1 correspond to the equivalent components of the components according to the disclosure, even though their structure and the materials used and thus the technical effect achieved can differ. FIG. 1 illustrates a container 1' which is moved on a transport surface 5' along a transport path A' on a conveyor track 3' by a carrier 4a'. However, only a roller chain 4' is shown here as a pulling element, whereas the pulling element in embodiments according to the disclosure, as already described above, can also be, inter alia, a rope, a belt, or a strap. In addition, the carriers 4a' represented here have no sliding contact with any guide, since no corresponding guide is provided.

Figure 2:
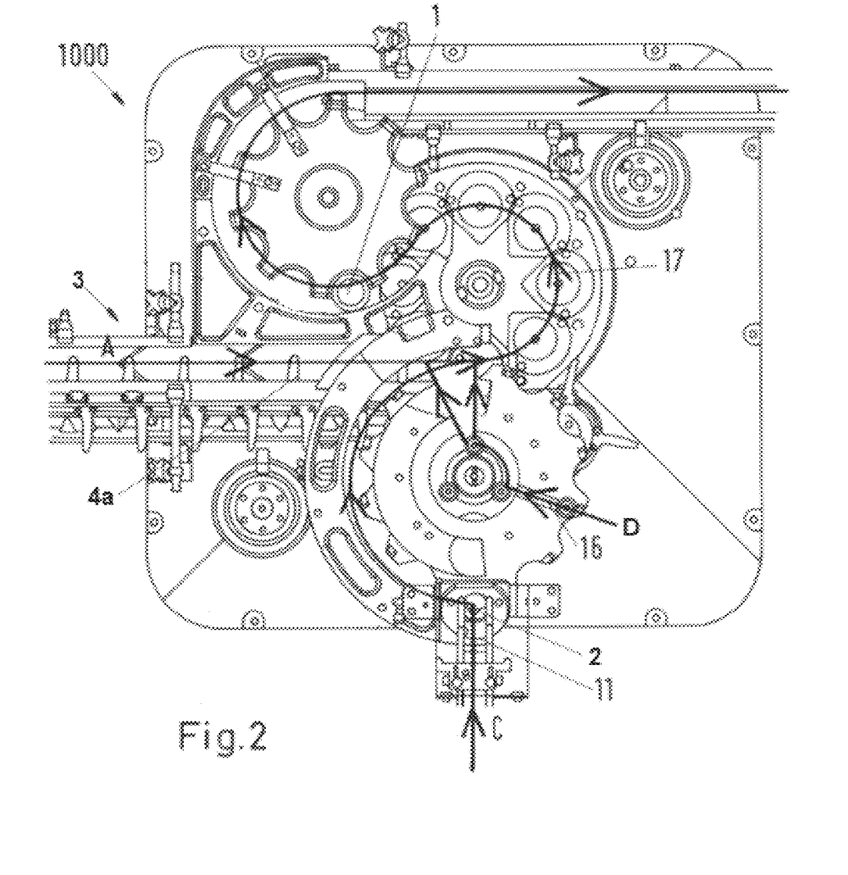
FIG. 2 illustrates a sealing module having a container feeding system according to the disclosure.

FIG. 2 illustrates a sealing module in the form of a can sealer 1000 with a container feeding system 3 according to the disclosure. When filling beverage cans or food cans, the cans 1 pass through a can sealer 1000 after being filled with the beverage or foodstuff, wherein the filled can bodies enter along the transport path via a feed path A by the container feeding system 3 by being guided by carriers 4a. Can lids 2 enter via a further feed path C by the lid feeder 11.

The can sealer 1000 usually has several similar stations arranged in a carousel shape, in each of which a can body is sealed with a can lid 2. The can lids 2 are guided onto the can bodies, wherein the can bodies are gassed along the arrow D by the gas supply 16. Subsequently, the can lids are held on the can body, wherein the holding serves to fix the cans 1 against breaking out of the circular path passed by the cans 1 in the can sealer 1000 due to the centrifugal force.

The can bodies are seamed with the can lid 2 over a seaming roll at the edges and thus sealed in the can sealer 1000. Normally, the can body with the can lid 2 is additionally rotated around its own axis of symmetry by the seaming head. For rotation, the seaming rolls and seaming heads are arranged on a respective seaming shaft.

Figure 3:
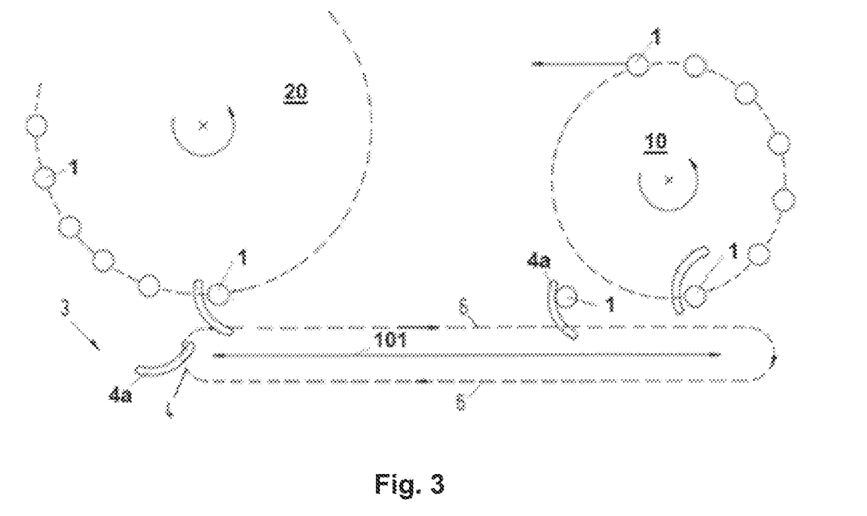
FIG. 3 illustrates a schematic view of a container feeding system according to the disclosure between a container receiver and a container source.

FIG. 3 illustrates the schematic interaction of container source 20, transport path 101 and container receiver 10. The containers 1 are received in a receiving area by the carriers 4a, transported by the carriers 4a along the transport path 101 to the transfer area where the containers 1 are received by the container receiver 10. In the embodiment according to FIG. 3, the pulling element 4 is designed as a circulating pulling element. There are two guides 6, which extend in a straight area along the transport path 101.

Figure 4:
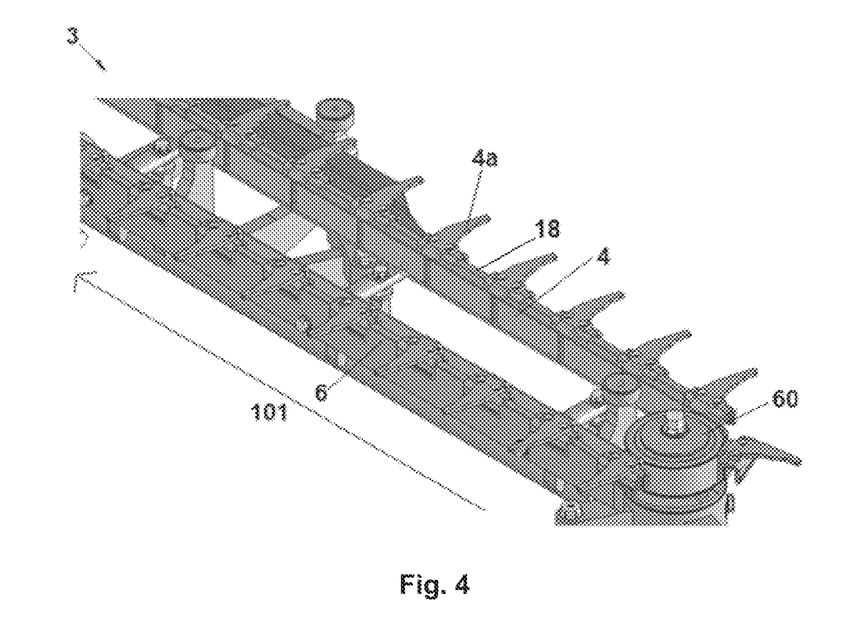
FIG. 4 illustrates a detail of a container feeding system according to the disclosure.

FIG. 4 illustrates a detail of the container feeding system 3 for the transport of a container along a transport path 101 from a container source to a container receiver. In particular, the container can be a can. The reception of the container from the container source and the transport to the container receiver is carried out by a carrier 4a which is designed as a finger. The carrier 4a is connected to a pulling element 4 in the form of a toothed flat belt 4 and is driven by it so that the carrier 4a can be moved along the transport path 101. In addition, a guide 6 is arranged along the transport path 101, which guide serves to guide the carrier 4a along the transport path 101. The carrier 4a is arranged at the guide 6 in such a way that it can be moved on a first surface 18 of the guide 6 in a sliding manner by the pulling element 4 and is guided along the transport path 101 in this way.

Figure 5:
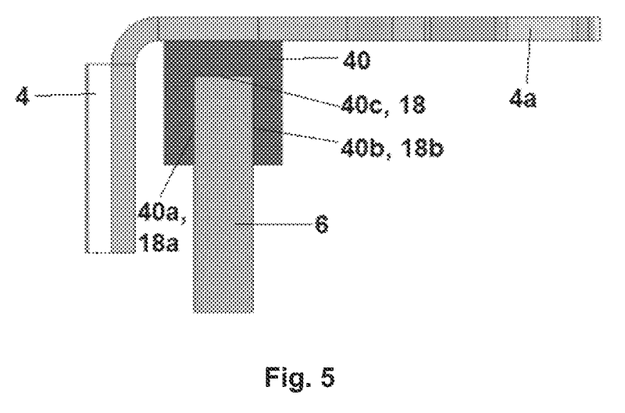
FIG. 5 illustrates an embodiment according to the disclosure of a carrier and its arrangement with pulling element, sliding element and guide, as a cross-sectional drawing.
Figure 6:
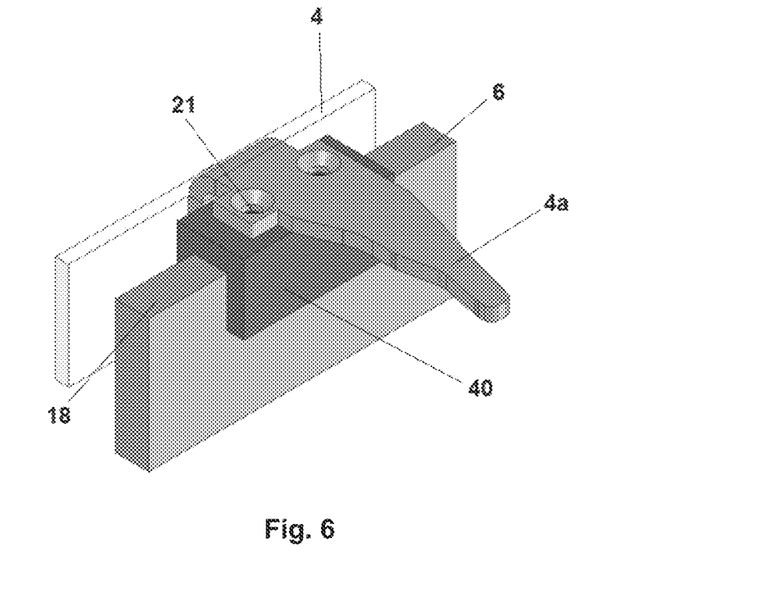
FIG. 6 illustrates an embodiment according to the disclosure of a carrier and its arrangement with pulling element, sliding element and guide, as an overview drawing.
Figure 7:
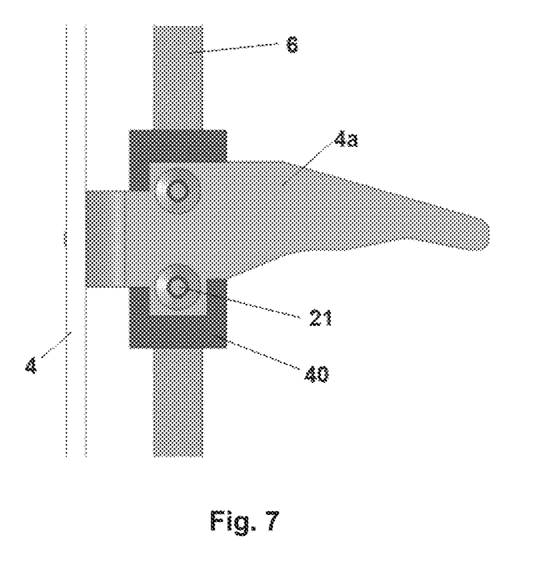
FIG. 7 illustrates an embodiment according to the disclosure of a carrier and its arrangement with pulling element, sliding element and guide, as a top view.

FIG. 5 to 7 show a preferred embodiment for an arrangement of the carrier 4a according to the disclosure with a sliding element 40.

As can be seen in FIG. 5 and FIG. 6, the carrier 4a is firmly connected to the pulling element 4, as well as to the sliding element 40. Here, the pulling element 4 is directly attached to the carrier 4a, but the pulling element 4 could also be connected to the sliding element 40, so that the carrier 4a is connected to the pulling element 4 via the sliding element 40. However, the arrangement represented is preferred because the pulling element 4 is thus further spaced from the guide 6 and contact between the pulling element 4 and the guide 6 can be avoided.

The sliding element 40 has three different sliding surfaces; a first sliding surface 40c which is also the supporting surface 40c, a second sliding surface 40a, and a third sliding surface 40b. The sliding surfaces 40c, 40a and 40b are arranged such that the sliding element 40 has a rectangular recess which corresponds to the shape of the guide 6, since the guide has a rectangular cross-section. Of course, the guide and the recess can also have a round or oval-shaped cross-section.

Here, the sliding element 40 sits on the guide 6 in such a way that it can be guided on it in a sliding manner, whereby the supporting surface 40c is in contact with the first surface 18 of the guide 6 over its entire surface, thus supporting the carrier 4a on the guide 6. In the embodiment shown here, the sliding element 40 is in contact in a sliding manner with three surfaces of the guide 6. In addition to the contact already described between the first surface 18 and the supporting surface 40c, there is also a contact between the second surface 18a and the second sliding surface 40a, and between the third surface 18b and the third sliding surface 40b. The second sliding surface 40a and third sliding surface 40b function here as side surfaces that laterally delimit the movement of the sliding element 40 at the guide.

As can be seen from FIG. 5 to 7, the carrier 4a is arranged at the guide 6 in such a way that it can be exclusively moved in a sliding manner along the guide 6, i.e., there is only a sliding contact between the sliding element 40 and the guide 6. Thus, there is no further contact, e.g., by a rolling element, and the surfaces of the sliding element sliding on the guide 6 are constant surfaces. i.e., the same surfaces are guided in a sliding manner along the entire guide 6.

Due to the contact of the carrier 4a via the sliding element 40 with the guide 6, forces and moments generated during the container transport can be absorbed by the guide 6 and consequently adverse vibrations can be suppressed.

It is understood that in other embodiments, the sliding element 40 can be designed such that it is in contact in a sliding manner with only one or two surfaces of the guide 6.

In addition, it can be seen from FIG. 6 that the sliding element 40 is attached to the carrier 4a by bores 21. The bores 21 are designed in such a way that, for example, a screw or a bolt can be guided through them through the carrier 4a into the sliding element 40, wherein the head of the screw or bolt is inserted into the hole of the bore 21 on the carrier side.

There are also embodiments according to the disclosure in which no sliding element 40 is necessary and the carrier 4a is directly in contact in a sliding manner with a surface of the guide 6. In these embodiments, a corresponding recess is preferably provided at the carrier. This recess allows the carrier 4a to have sliding contact with three surfaces of the guide 6. Here, the sliding element can be an integral component of the carrier. In this regard, embodiments are conceivable that allow contact between only one or two surfaces of the guide 6 and the carrier 4a Embodiments are also conceivable in which the sliding element 40 is an integral component of the carrier 4a.

The technical effect of the guide 6 is in particular to absorb the vibrations of a drive 60 according to FIG. 4 (such as a motor) so that they cannot be transmitted to the container, thus avoiding spillage of the contents.

As represented in FIG. 1, the container feeding systems known from the state of the art are moved via a pulling element 4', which is a chain. As described at the beginning, these chains 4' transmit vibrations of the motor almost undamped to the carriers 4a'. In addition, the chains require lubricants and microfilms can form in the dead spaces of the chains 4' which have to be removed regularly.

According to the disclosure, in order to avoid this, in addition to the guide, instead of a chain, a belt, a rope or particularly preferably a strap can be used. FIGS. 4 and 7 show how the carriers 4a are attached to this type of pulling element 4. Here, the carriers are curved in an L-shape such that they each form a right angle. Of course, a right angle is not mandatory, however. One arm of the angle thus formed is connected to the sliding element 40, wherein the sliding element 40 is arranged at the inside of the angle. The other arm of the angle is connected to the pulling element 4. In this case, the pulling element 4 is arranged at the side facing away from the right angle. Thus, the carrier 4a is connected only to the outward-facing surface of the pulling element 4.

However, since the vibrations caused by the motor are also absorbed by the sliding of the carrier 4a or the sliding element 40 on the guide 6 and are thus no longer transmitted to the container, embodiments according to the disclosure are also conceivable in which a chain or another component made up of links is still used, in which adjacent links are connected to one another.

In FIG. 4, the interaction of these critical parts is shown. In addition, it can be seen that the force of the drive 60 is transmitted to the carriers 4a via the pulling element 4 coupled to it, whereby the carriers 4a are moved along the transport path 101. In FIG. 4, the pulling element 4 is designed as a flat toothed belt. This is also preferable to a chain, since higher transport speeds can be achieved, and a chain expands due to the connections.

Here, it can be seen from FIG. 4 that the guide 6 is interrupted in the area of the drive 60, i.e., it comprises two parts arranged in series. In addition, the guide 6 is designed to be narrower at its ends to enable the carriers 4a to be guided on more easily.

For example, the guide 6 shown in FIG. 4 can be made of a metal, in a preferred embodiment made of or coated with an alloy.

The sliding element 40 preferably consists of or is coated with a ceramic material or consists of or is coated with a thermoplastic material.

It is understood that the discussed specific embodiments of the disclosure are to be understood as merely exemplary and the disclosure is of course not limited to these alone. In particular, the person skilled in the art understands that the described embodiments can be combined in any suitable manner and that simple further embodiments obvious to the person skilled in the art are naturally also comprised by the claimed scope of protection.

The invention claimed is:

1. A container feeding system for transporting a container along a transport path from a container source to a container receiver, comprising:
   a carrier configured to receive and transport the container;
   a pulling element connected to the carrier such that the carrier is capable of moving along the transport path; and
   a guide arranged along the transport path configured to guide the carrier along the transport path,
   the carrier arranged at the guide such that the carrier is capable of being moved by the pulling element in a sliding manner along a first surface of the guide,
   the container source being a container dispenser configured to provide empty containers, the container receiver or the container source being a filling station configured to fill the container with a filling material, or the container receiver being a sealing module configured to seal the container by a lid.

2. The container feeding system according to claim 1, wherein the carrier comprises a sliding element having at least a first sliding surface, and the sliding surface is arranged at the first surface such that the carrier is capable of being moved in a sliding manner along the first surface of the guide via the sliding element.

3. The container feeding system according to claim 2, wherein the sliding element is a separate element from the carrier and is fixed to the carrier, the sliding element arranged between the carrier and the guide.

4. The container feeding system according to claim 2, wherein the sliding element and the carrier are made in one piece so that the sliding element is an integral element of the carrier.

5. The container feeding system according to claim 2, wherein the first sliding surface is a first supporting surface, which rests on the first surface such that the carrier is capable of being moved in a sliding manner along the first surface of the guide via the supporting surface.

6. The container feeding system according to claim 5, wherein the sliding element comprises a second sliding surface, and the second sliding surface is arranged at the supporting surface such that the second sliding surface is capable of being moved in a sliding manner along a second surface of the guide.

7. The container feeding system according to claim 6, wherein the sliding element comprises a third sliding surface, and the third sliding surface is arranged at the supporting surface and spaced from the second sliding surface, such that the third sliding surface is capable of being moved in a sliding manner along a third surface of the guide.

8. The container feeding system according to claim 1, wherein the guide comprises at least one straight portion and at least one curved portion.

9. The container feeding system according claim 1, further comprising a circulating track, the circulating track, with respect to a direction of movement of the carrier, comprising a first portion between the container source and the container receiver and comprising a second portion between the container receiver and the container source, the container is capable of being transported along the transport path by the first portion in an operating state.

10. The container feeding system according to claim 1, further comprising a drive coupled to the pulling element such that the pulling element is capable of being moved by the drive.

11. The container feeding system according to claim 1, further comprising a plurality of carriers, the plurality of carriers connected to the pulling element.

12. The container feeding system according to claim 1, further comprising a conveyor track with a transport surface for the containers, the conveyor track arranged along the guide such that the container is capable of being moved by the carrier in a sliding manner across the transport surface.

13. The container feeding system according to claim 12, further comprising a container guiding device is arranged at the conveyor track such that a movement of the container on the conveyor track is capable of being restricted by the container guiding device, the container guiding device extending parallel to the guide.

14. The container feeding system according to claim 1, wherein the pulling element is a belt, a rope, or a strap.

15. The container feeding system according to claim 1, wherein the pulling element is arranged spaced from the guide such that no contact occurs between the pulling element and the guide during the movement of the carrier along the first surface.

16. The container feeding system according to claim 1, wherein the carrier is arranged at the guide such that the carrier is capable of being exclusively moved in a sliding manner along the guide.

17. A processing device for processing a container, comprising:
   a container source;
   a container receiver; and
   the container feeding system according to claim 1, the container receiver feeding system being arranged between the container source and the container receiver, and being configured to transport the container from the container source to the container receiver.

18. A method for transporting containers, comprising:

providing a container feeding system according to claim 1;

receiving the container by the carrier in a receiving area from the container source;

transporting the container by the carrier along the transport path, the carrier moving in a sliding manner along the first surface; and delivering the container to the container receiver in a transfer area.

* * * * *